United States Patent [19]
Norton

[11] Patent Number: 4,694,238
[45] Date of Patent: * Sep. 15, 1987

[54] DUAL VOLTAGE POWER SUPPLY SYSTEM FOR VEHICLES

[76] Inventor: Peter Norton, 4787 Woodworth, Dearborn, Mich. 48126

[*] Notice: The portion of the term of this patent subsequent to Aug. 5, 2003 has been disclaimed.

[21] Appl. No.: 843,108

[22] Filed: Mar. 24, 1986

Related U.S. Application Data

[63] Continuation of Ser. No. 569,723, Jan. 10, 1984, Pat. No. 4,604,528.

[51] Int. Cl.⁴ ............................ H02J 7/14; H02P 9/30
[52] U.S. Cl. ........................................ 322/28; 320/61; 322/90
[58] Field of Search ................ 322/28, 89, 90; 320/15, 320/17, 59, 61, 64; 307/75

[56] References Cited

U.S. PATENT DOCUMENTS

3,710,226  1/1973  Seike ..................................... 320/15
4,047,088  9/1977  Himmler ............................ 322/90 X
4,210,856  7/1980  Taylor .................................. 320/17
4,281,279  7/1981  Gurwicz ............................ 320/59 X
4,491,779  1/1985  Campbell et al. ................. 320/17 X
4,604,528  8/1986  Norton ............................. 307/75 X Primary Examiner—R. J. Hickey
Attorney, Agent, or Firm—Reising, Ethington, Barnard, Perry & Milton

[57] ABSTRACT

A dual voltage power supply for a vehicle is disclosed with a DC generator, a single storage battery, a low voltage load circuit including the storage battery and a high voltage load circuit including load devices designed to be powered by voltages higher than the battery voltage. A high voltage regulator is responsive to the generator output voltage and controls the energization of the field winding of the generator for causing the generator to produce an output voltage meeting the requirements of the high voltage load circuit. A low voltage regulator receives the output voltage of the generator and produces a substantially constant regulated voltage for charging the battery and supplying the low voltage load circuit.

21 Claims, 5 Drawing Figures

DUAL VOLTAGE POWER SUPPLY SYSTEM FOR VEHICLES

This is a continuation of application Ser. No. 569,723, filed on Jan. 10, 1984, now U.S. Pat. No. 4,604,528.

FIELD OF THE INVENTION

This invention relates to an electrical system for vehicles; more particularly, it relates to a power supply system which supplies two different load circuits with different voltages.

BACKGROUND OF THE INVENTION

The typical electrical power supply system for automotive vehicles is a so-called constant voltage system having a nominal rated voltage of 12 volts. It comprises, in general, a storage battery, DC generator and a regulator to maintain the generator output voltage and current within certain limits. The generator, which typically takes the form of an alternator with a rectifier, is driven at variable speed by the vehicle engine and supplies the DC power to charge the battery. The regulator is typically a switching device for alternate connecting and disconnecting the field coil of the alternator across the battery when the output voltage of the generator is respectively below and above a desired value and for disconnecting the field coil from the battery when the generator current exceeds a predetermined value.

The typical automotive electrical system has become somewhat complex with more and a wider variety of load devices. The conventional 12 volt system has certain disadvantages in supplying the various load devices. One disadvantage is that certain devices such as air blowers and window heaters which require relatively large amounts of power must be connected through large wires because of high current requirements. Another disadvantage is that certain load devices otherwise suited to automotive applications, such as metal-film type window heaters, require higher voltage than the conventional 12 volt supply. Further, power semiconductor devices are inherently much less efficient and/or more expensive for controlling power at 12 volts than for controlling the same power at higher voltage such as 24 or 40 volts.

The prior art relating to vehicular electrical systems is replete with dual voltage power supplies of various forms.

The electrical systems of certain large trucks utilize a 24 volt cranking motor while the other accessory devices are rated at 12 volts. In such systems, two 12 volt batteries are provided which are connected in series for supplying the cranking motor and are connected in parallel for charging to 12 volts by the generator and for supplying the 12 volt load devices. Various arrangements have been proposed to eliminate the need for the series-parallel switching arrangement in such dual voltage systems. In the Raver U.S. Pat. No. 3,962,621, a dual battery charging generator system is described for 12 and 24 volt batteries. In this system, the alternator output is rectified and used to charge the 12 volt battery whereas the alternator output is transformed to a higher voltage and rectified to charge the 24 volt battery. In the Baumgartner et al U.S. Pat. No. 3,793,544, a dual voltage system is described in which an alternator is provided with a pair of stator windings and respective rectifiers to provide two different output voltages. In the Taylor U.S. Pat. No. 4,210,856, a dual voltage system is provided with two different batteries. One battery is charged from an alternator-rectifier and the two batteries in series are charged from a DC-to-DC converter energized from the first battery. Another dual voltage, dual battery system is disclosed in the Himmler U.S. Pat. No. 4,047,088. In this system, the output of the three-phase alternatorrectifier is used to charge two 12 volt batteries which are connected in series across the 24 volt load circuit. One of the batteries, which is connected with the 12 volt circuit, is charged by an auxiliary charging circuit which is connected across one of the phase windings of the alternator. In the Seike U.S. Pat. No. 3,710,226, a dual voltage system with two batteries is disclosed in which the two batteries are connected in series. One of the batteries is charged by two cooperating phases of the alternator, the output of which is controlled by a field regulator for the alternator. The other battery is charged by the third phase of the alternator, the output of which is regulated by a series regulator. In the Follmer U.S. Pat. No. 4,044,293, a dual voltage system with two batteries is described in which the alternator charges the series combination of the batteries. A separate regulator is provided for one of the batteries and when it is fully charged, the regulator is effective to bypass that battery out of the circuit so that the alternator is connected only with the first battery.

A general object of this invention is to provided an improved dual voltage power supply system for automotive vehicles which overcomes certain disadvantages of the prior art.

SUMMARY OF THE INVENTION

This invention provides a dual voltage power supply for vehicles which is adapted to supply one load circuit at a regulated voltage and to supply a second load circuit at a varying voltage higher than the regulated voltage. The invention is embodied in a vehicular electrical system which includes a generator, such as a conventional alternator, which has a field winding of controlled energization. A first load circuit includes one or more load devices designed to be energized at the rated voltage of the battery and is connected across the battery. A second load circuit includes one or more load devices designed to be energized at a voltage substantially higher than the rated voltage of the battery. In accordance with the invention, a first regulator is coupled between the output of the generator and the first load circuit and produces an output voltage meeting the requirements of the first load circuit. Further, a second regulator is responsive to the generator output voltage and is coupled with the field winding of the generator for controlling the generator to produce an output voltage meeting the requirements of the second load circuit, the generator output being coupled with the second load circuit. Preferably, the first regulator comprises a switching means and an inductor in circuit between the generator and the first load circuit and means responsive to the first regulator output voltage for controlling the duty cycle of the switching means. Further, switching means is provided for recirculating the inductor current as required to prevent voltage across the first load circuit from exceeding a predetermined value. The second regulator is adapted to regulate the generator output voltage at said higher voltage when the generator speed is great enough for the higher output voltage to be achieved and to regulate the generator output voltage at its maximum achievable value at lower speeds.

A more complete understanding of this invention may be obtained from the detailed description that follows taken with the accompanying drawings.

BEST MODE FOR CARRYING OUT THE INVENTION

Referring now to the drawings, there is shown an illustrative embodiment of the invention in a dual voltage power supply using the alternator and single battery of a conventional automotive vehicle. If will be appreciated as the description proceeds, that the invention is useful in other applications and in different embodiments.

Figure 1:
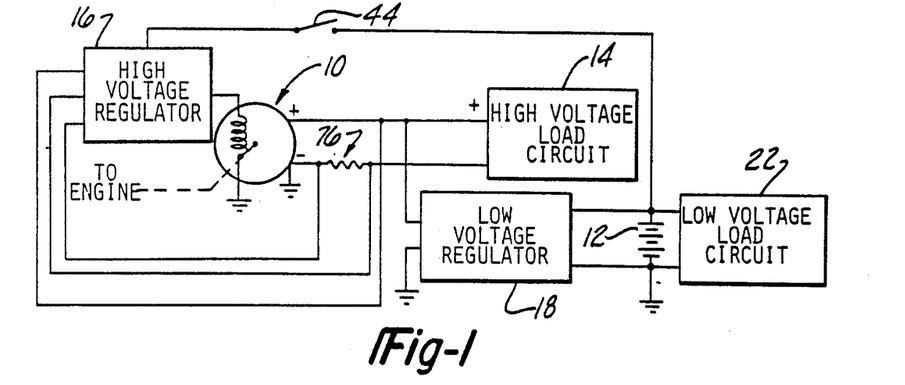
FIG. 1 is a block diagram of the dual voltage system of this invention.

The dual voltage power supply of this invention is represented in block diagram in FIG. 1. The system comprises, in general, a generator 10 driven at variable speeds by the vehicle engine, and a storage battery 12. The generator 10 supplies output voltage directly to the high voltage load circuit 14 and is controlled by a high voltage regulator 16. The generator output voltage is supplied through a low voltage regulator 18 to charge the battery 12 and to supply a low voltage circuit 22. The generator 10 is suitably a conventional automotive alternator which is capable of producing a DC output voltage ranging from less than twenty volts at engine idle speed to perhaps 100 volts at high speed of the engine. The high voltage load circuit 14 may include high power load devices such as a heater fan and a high voltage load device such as a metal film window heater, such load devices being adapted to operate at voltages up to say 40 volts. The storage battery 12 is a conventional 12 volt automotive battery. The low voltage load circuit 22 includes the conventional automotive accessories which are rated for 12 volts such as the lamps, horn and starter motor.

Figure 2:
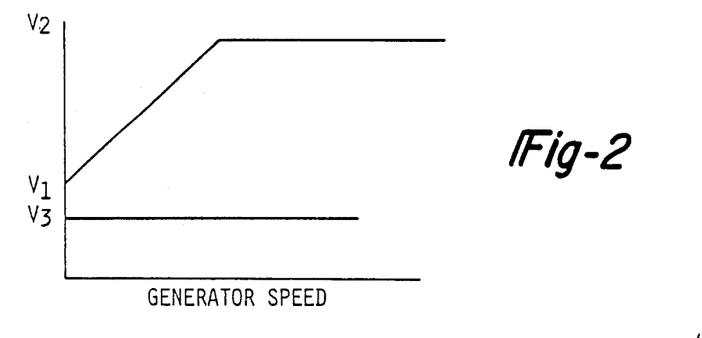
FIG. 2 is a graph showing the general relationship between the system output voltages and generator speed.

The dual voltage power supply of this invention is adapted to produce a substantially constant low voltage output for supplying the low voltage load circuit 22 as shown in FIG. 2. The low voltage output VB is regulated at the value of the battery voltage and is substantially independent of engine speed. The output of the generator or alternator 10 which is applied to the high voltage load circuit 14 may vary from a low voltage V1 at idle speed of the engine to a regulated value V2 which is achieved by the alternator only when a predetermined speed is reached. This output voltage V2 is maintained by the regulator 16 so long as the alternator is driven at the predetermined speed or higher.

Figure 3:
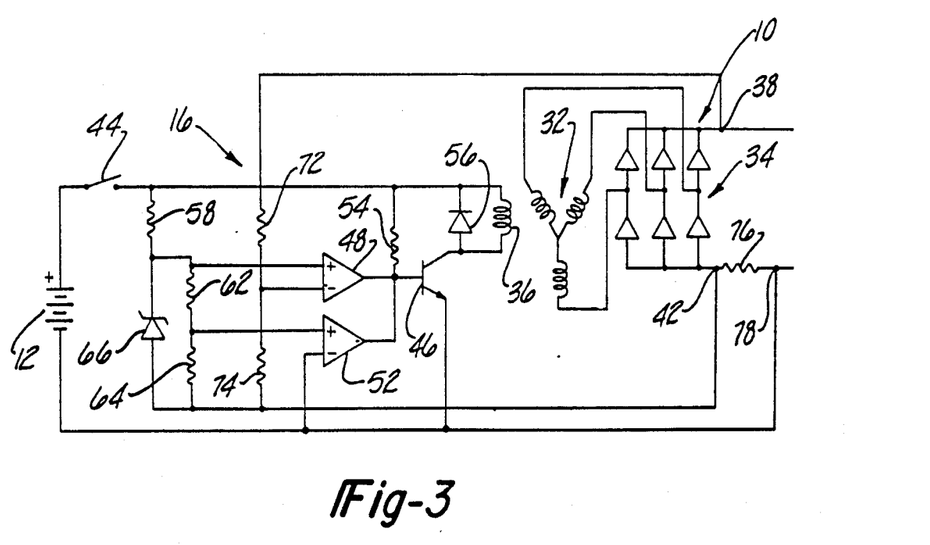
FIG. 3 is a schematic diagram of a regulator for the high voltage output of the system.

The high voltage regulator 16 for the alternator 10 is shown in the schematic diagram of FIG. 3. As shown in this diagram, the alternator 10 comprises a three phase stator winding 32, a bridge rectifier 34 and a rotor field winding 36. The current in the field winding 36 is controlled by the high voltage regulator 16 in order to produce the desired DC voltage at the alternator terminals 38 and 42. The high voltage regulator 16 is coupled with the battery 12 through an ignition switch 44 and the regulator becomes operative when the switch is closed. The regulator 16 comprises, in general, a switching transistor 46 connected in series with the field winding 36 across the battery 12; the switching transistor 46 is controlled by a pair of comparators 48 and 52 for regulating the voltage and current of the alternator. Many regulators that control the output of a conventional alternator to maintain a predetermined voltage are known. Other known regulators may be substituted for the regulator illustrated in FIG. 3.

The high voltage regulator 16 will now be described in greater detail. The field winding 36 is connected in series with the collector-to-emitter circuit of the transistor 46 across the battery 12. The transistor 46 has its base connected through a resistor 54 to the positive terminal of the battery. The resistor 54 is of such value that it supplies enough current to the base-to-emitter circuit of the transistor 46 so that the transistor is switched on, provided that the outputs of both comparators 48 and 52 are in a high state. A diode 56 is connected across the field winding 36 to provide a current path for the field current when the transistor 46 is turned off. In order to provide a set of reference voltages, a voltage divider including resistors 58, 62 and 64 is connected in series between the positive terminal of the battery 12 and the negative output terminal 42 of the alternator 10. To provide a first reference voltage corresponding with the desired output voltage of the alternator across resistors 62 and 64, a zener diode 66 is connected in parallel therewith. A first reference voltage is derived from the junction of resistors 58 and 62 and is applied to the noninverting input of the comparator 48. This reference voltage has a value corresponding to the desired output voltage of the alternator. In order to supply an input voltage to the inverting input of comparator 48, the output terminals 38 and 42 of the alternator are connected across a pair of voltage divider resistors 72 and 74. The signal voltage corresponding to the alternator output voltage is derived from the junction of resistors 72 and 74 and applied to the inverting input of the comparator 48. A reference voltage for the comparator 52 corresponding to the desired limiting or maximum alternator current is derived from the junction of voltage divider resistors 62 and 64 and applied to the noninverting input of the comparator 52. The signal voltage corresponding to the actual alternator output current is derived across a current sensing resistor 76 which is connected between the alternator output terminal 42 and a low voltage supply terminal 78. This value of voltage is supplied as the current signal voltage to the inverting input of the comparator 52.

The operation of the high voltage regulator is as follows. The ignition switch 44 is closed and the regulator becomes operative. With the alternator 10 operating at the engine idle speed, the alternator output voltage will be below the regulated value V2. Accordingly, the reference voltage applied to the noninverting input of the comparator 48 will be greater than the signal voltage applied to the inverting input and the comparator output will be in a high state. Similarly, if the current output of the alternator is below the maximum value so the signal voltage developed across the sensing resistor 76 is less than the reference voltage developed across the resistor 64 then the voltage at the noninverting input of comparator 52 will be greater than the signal voltage at the inverting input and the output of the comparator 52 will be in the high state. With both comparators in the high state, the current through the resistor 54 will enter the base-to-emitter circuit of the switching transistor 46 and will turn it on. Thus, the field winding 36 is energized by connection through the transistor 46 to the battery 12. With increasing speed of the alternator 10, the alternator output voltage will increase. When the output voltage exceeds the regulated value, the signal voltage at the inverting input of the comparator 48 will exceed the reference voltage at the noninverting input and the output of the comparator 48 will switch to a low state. This causes the current through the resistor 54 to be diverted from the base of transistor 46 to the output circuit of the comparator 48 and the transistor 46 is turned off which deenergizes the field winding 36. As a result, the output voltage of the alternator will decrease and the comparator 48 will switch back to the high state causing transistor 46 to be turned on to energize the field winding 36. This switching action of the transistor 46 will continue at a high rate of repetition so long as the speed of the alternator is high enough to cause the output voltage to reach the regulated value. If the average output current of the alternator exceeds the predetermined value, the signal voltage at the inverting input of the comparator 52 will exceed the reference voltage at the noninverting input and the output of the comparator will switch to a low state. This will turn off the transistor 46 and deenergize the field winding 36 until the current has dropped below the maximum value. This switching action will be repetitive as required to maintain the alternator output current at or below the predetermined maximum.

Figure 4:
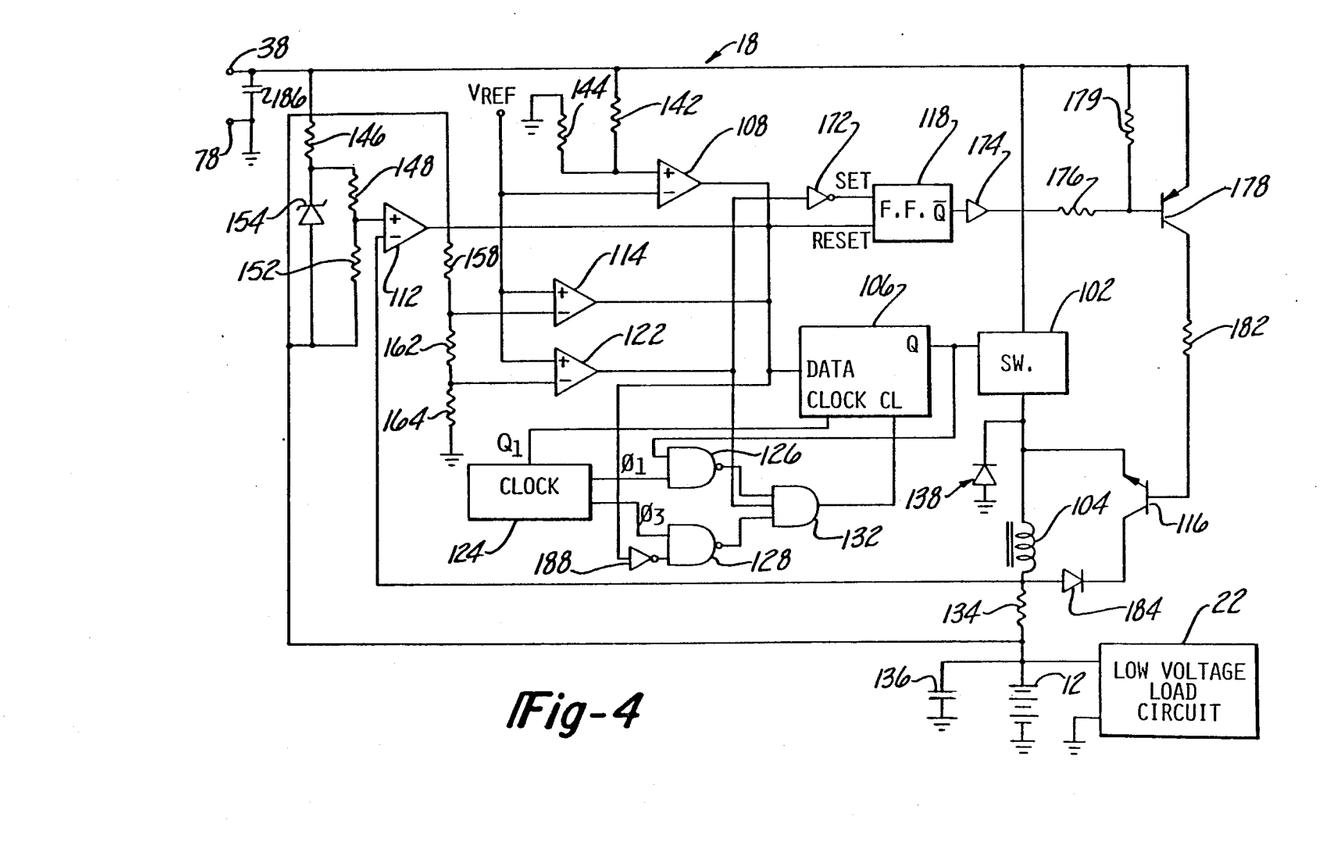
FIG. 4 is a schematic diagram of a regulator for the low voltage output of the system.
Figure 5:
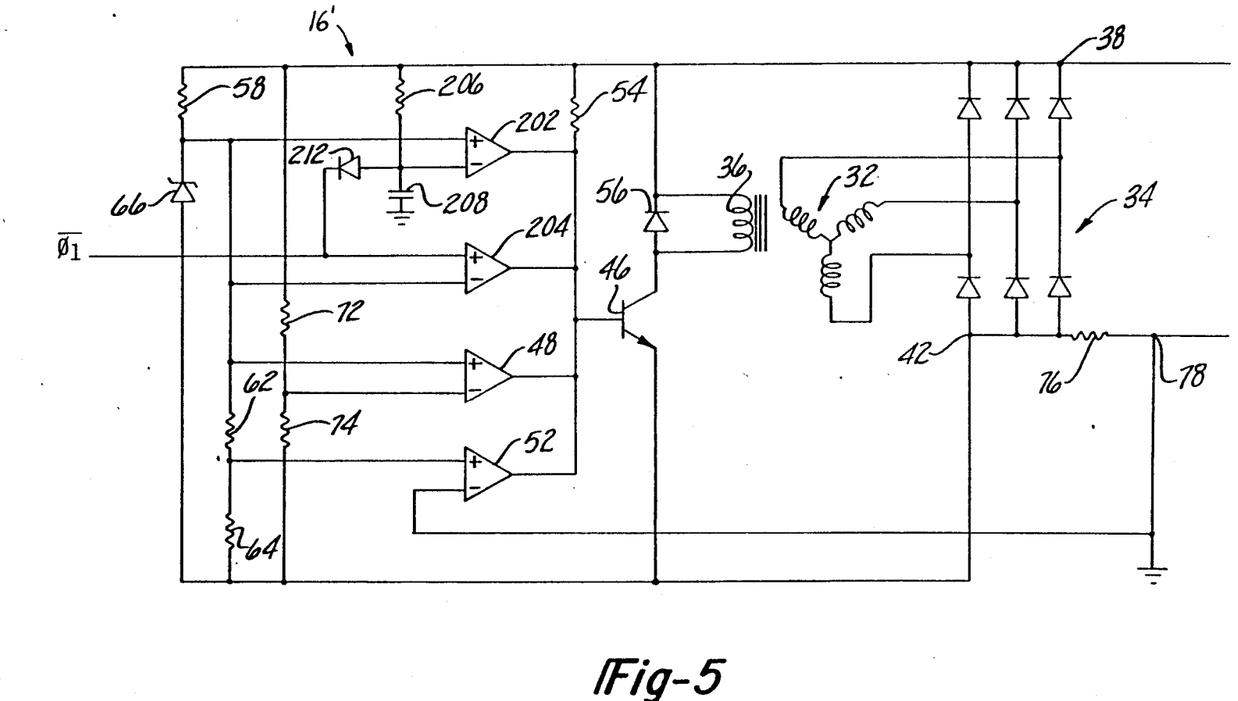
FIG. 5 is a schematic diagram of a modification of the regulator for the high voltage output of the system.

A modification of the high voltage regulator is shown in FIG. 5. The description of the regulator in FIG. 5 will be given subsequent to the description of the low voltage regulator of FIG. 4 for the reason that the high voltage regulator of FIG. 5 utilizes a clock signal from the circuit of FIG. 4.

The low voltage regulator 18, shown in schematic diagram in FIG. 4, will now be described. This regulator is adapted to maintain the battery circuit and the low voltage load circuit at a desired voltage, to limit the low voltage load circuit current to a predetermined value and to protect load devices from excessive voltage resulting from a defective battery condition.

The low voltage regulator 18 comprises, in general, a main switch 102 and an inductor 104 connected in series between the alternator output terminal 38 and the battery 12. The main switch 102 is controlled by logic circuitry including a flip-flop 106 and a set of comparators 108, 112 and 114 which indicate selected operating conditions of the alternator and battery. An auxiliary switch 116 is connected across the inductor 104 and is controlled by logic circuitry including a flip-flop 118 and a comparator 122 which indicates excessive battery voltage. The logic circuitry is operated under the control of a three phase clock 124 through NAND gates 126 and 128 and an AND gate 132.

The main switch 102 is a semi-conductor switch of conventional design and is opened when the Q output of the flip-flop 106 is at logic low and it is closed when the Q output is at logic high. When the main switch 102 is closed, the alternator voltage from output terminal 38 is applied across the inductor 104, a current sensing resistor 134 and the parallel combination of the battery 12, the low voltage load circuit 22 and a capacitor 136. A diode 138 is connected between the upper terminal of the inductor 104 and ground.

The comparator 108 is adapted to test whether the output voltage of the alternator is above a minimum value which is high enough to warrant closing of the main switch 102 for the purpose of supplying power to the battery circuit. For this purpose, a reference voltage is applied to the inverting input of the comparator 108. A pair of voltage divider resistors 142 and 144 are connected in series across the alternator terminals and a signal voltage corresponding to alternator voltage is applied to the noninverting input of the comparator 108. The output of the comparator 108 combined with the outputs of comparators 112 and 114 is connected with the data input of the flip-flop 106. The output of the comparator 108 is at logic low when the signal voltage is less than the reference voltage and is at logic high when it exceeds the reference voltage provided none of the other comparators are forcing the common output line to a low level.

The comparator 112 is adapted to test whether there is an excessive current through the inductor 104. For this purpose, a reference voltage circuit, including series resistor 146 and zener diode 154 is connected between the positive terminal 38 of the alternator and the positive terminal of the battery 12. The voltage across the zener diode 154 is divided by resistors 148 and 152 and a reference voltage from the junction of the resistors 148 and 152 is applied to the noninverting input of the comparator 112. A signal voltage corresponding to the current through the inductor 104 is developed across the current sensing resistor 134. This voltage is applied to the inverting input of the comparator 112. The output of the comparator 112 is combined with the outputs of comparators 108 and 114 and is applied to the data input of the flip-flop 106. When the inductor current is less than the predetermined limit the output of the comparator 112 is at logic high providing none of the other comparators are forcing the common output line to a low level and when the inductor current exceeds the predetermined limit, the output is at logic low.

The comparator 114 is adapted to test whether the battery circuit voltage is below a desired battery circuit voltage. A reference voltage corresponding to the desired battery circuit voltage is applied to the noninverting input of the comparator 114. A voltage divider including series resistors 158, 162 and 164 is connected across the battery 12 and a signal voltage corresponding to the battery voltage is derived at the junction of resistors 158 and 162 and applied to the inverting input of the comparator 114. The output of the comparator 114 is combined with the outputs of comparators 108 and 112 and is applied to the data input of the flip-flop 106. When the signal voltage is less than the reference voltage, the output of the comparator 114 is at logic high providing none of the other comparators are forcing the common output line to a low level and when the signal voltage is greater than the reference voltage the output is at logic low. It is noted that the outputs of comparators 108, 112 and 114 are all directly connected with the data input of the flip-flop 106 and hence the outputs are logically ored so that if any output is at logic low, the data input of the flip-flop 106 is at logic low. The flip-flop 106 is a D type flip-flop and with a logic high at the data input, the flip-flop is set so there is a logic high on the Q output on a rising clock signal. The clock input of the flip-flop 106 is connected with the $\phi1$ output of the three phase clock 124. The clear input of the flip-flop 106 is connected with the output of an AND gate 132.

The auxiliary or recirculating switch 116 is controlled by the flip-flop 118 to allow the current through inductor 104 to recirculate in the event that the battery circuit voltage becomes excessive. This may happen, for example, when corrosion of a battery terminal effectively disconnects the battery so the battery cannot stabilize the voltage of the low voltage circuit. For this purpose, the comparator 122 is adapted to test whether the battery circuit voltage exceeds a predetermined value. The noninverting input of the comparator 122 is connected with the reference voltage corresponding to the desired battery circuit voltage. A signal voltage corresponding to the actual battery circuit voltage is derived from the junction of resistors 162 and 164 and applied to the inverting input of the comparator 122. The output of the comparator 122 is applied through an inverter 172 to the set input of the flip-flop 118. When the signal voltage exceeds the reference voltage the output of the comparator 122 is at logic low which causes flip-flop 118 to be set and when the signal voltage is less than the reference voltage the output is at logic high. The reset input of the flip-flop 118 is connected with the data input of the flip-flop 106 and thus the flip-flop 118 is reset when all of the outputs of comparators 108, 112 and 114 are at logic high which is the logical condition that leads to the closing of switch 102. When flip flop 118 is in its set state recirculating switch 116 is to be switched to its conducting state for recirculating the current through inductor 104. For this purpose, the output of the flip-flop 118 is applied through an amplifier 174 and a resistor 176 to the base of a switching transistor 178. A resitor 179 insures that switching transistor 178 is in the off state when it is supposed to be off. The output of amplifier 174 is an open-collector-to-ground circuit. The transistor 178 has its emitter connected with the positive output terminal of the alternator and its collector connected through a resistor 182 to the base of the recirculating switching transistor 116. The emitter of transistor 116 is connected with the upper terminal of the inductor 104 and the collector is connected through a diode 184, which prevents reverse current flow, with the lower terminal of the inductor 104. A capacitor 186 is connected across the output terminals 38 and 78 of the alternator to stabilize the voltage as the switch 102 cycles on and off The clock 124 as described above, is a three phase clock for control of the cycling of the regulator circuits. The $\overline{\phi}1$ output is connected with the clock input of the flip-flop 106. The $\phi1$ output is connected with one input of the NAND gate 126. The other input of the NAND gate 126 is connected with the Q output of the flip-flop 106. The output of the NAND gate 126 is applied to one input of the AND gate 132. The $\phi3$ output of the clock 124 is applied to one input of the NAND gate 128. The combined outputs of comparators 108, 112 and 114 is applied through an inverter 188 to the other input and the NAND gate 128. The output of the NAND gate 128, is applied to the second input of the AND gate 132. The output of the comparator 122 is applied to the third input of the AND gate 132. The output of the AND gate 132 is applied to the clear input of the flip-flop 106 which is cleared whenever the clear input is low.

The operation of the low voltage regulator circuit 18 is as follows. In the start-up condition with the engine running below idle speed, the alternator voltage across the output terminals 38 and 78 is relatively low. When the alternator output voltage is below the predetermined minimum which would warrant attempting to supply power to the battery circuit, the signal voltage at the noninverting input of comparator 108 is less than the reference voltage at the inverting input. Accordingly, the output of the comparator 108 is at logic low and this output is applied to the data input of the flip-flop 106. In this operating condition, the data input of the flip-flop 106 is held at logic low regardless of the outputs of the comparators 112 and 114. During the first phase of the clock the $\phi1$ clock signal is at logic high so that if the Q output of flip flop 106 is also high the output and NAND circuiti 126 will be low and the output of AND circuit 132 will be low activating the clear input of flip flop 106 and causing the Q output of flip flop 106 to go to its low state. Therefore, during phase 1 of the clock cycle the Q output of flip flop 106 will be in its low state. At the end of the first phase of the three phase clock 124, the rising clock input to the flip-flop 106 will cause the Q output to go to logic high only if the data input is at logic high. Assuming that the data input remains at logic low during the first phase, the Q output will remain at logic low and the main switch 102 will remain turned off. The Q output of the flip-flop 106 will remain at logic low throughout all three phases of the clock cycle. This condition will obtain until the alternator voltage exceeds the predetermined minimum value which causes the output of the comparator 108 to go to logic high. When this condition is reached, the data input of the flip-flop 106 will be at logic high provided that the output of comparator 112 and the output of comparator 114 are at logic high. The output of comparator 112 will be at logic high unless there is an excessive current through the inductor 104 and the output of the comparator 114 will be at logic high if the battery circuit voltage is less than the desired voltage. In this condition, with the data input of flip-flop 106 at logic high, the Q output of the flip-flop 106 will go to logic high at the end of the first phase of the clock cycle when the $\overline{\phi}1$ signal goes high. This will turn on the main switch 102 and the alternator voltage is applied through the inductor 104 to the battery 12. The switch 102 remains turned on during phase 2 of the clock 124 unless the comparator 122 senses an excessive voltage across the battery 12 which causes the output of the comparator 122 to go to logic low. If the output of the over-voltage comparator 122 goes to logic low the output of AND circuit 132 will be low causing flip flop 106 to be cleared so its Q output goes low and turns switch 102 off. At the same time, the logic low output of the over-voltage comparator 122 is applied through the inverter 172 to the set input of the flip-flop 118. This causes the $\overline{Q}$ output of the flip-flop to go to logic low and the open collector to ground circuit of amplifier 174 conducts thus causing the switching transistor 178 to be turned on. As a result, the recirculating switching transistor 116 is turned on and the current through the inductor 104 recirculates through the diode 184 and the switching transistor 116 thus eliminating that input to the battery circuit. If there is no over-voltage across the battery 12 during phase 2, the main switch 102 remains on. During phase 3 the flip-flop 106 can be reset because the clock signal $\phi3$ to the NAND gate 128 is high which causes the output of NAND gate 128 to go to logic low if the other input from the inverter 188 is also at logic high which will happen if any of the comparators 108, 112 or 114 indicates that increased current through the inductor 104 is not desired. This logic low output of the NAND gate 128 is applied to one input of the AND gate 132 causing the output thereof to go to logic low. This low output of the AND gate 132 is applied to the clear input of the flip-flop 106 which causes the Q output thereof to go to logic low which turns off the main switch 102. During phase 3, the main switch 102 remains on unless the low voltage comparator 108, the excess current comparator 112 or the regulating voltage comparator 114 produces a logic low output indicating that increased output current is not desired. Assuming the Q output of flip-flop 106 remained high during $\phi 3$, the clock signal $\phi 1$ will cause the output of the NAND gate 126 to go to logic low which causes the output of the AND gate 132 to go to logic low. The logic low at the clear input of the flip-flop 106 causes the Q output thereof to go to logic low and the main switch 102 is turned off.

The operation of the low voltage regulator 18 may be summarized as follows. The main switch 102 is held in the off state during the first phase of the clock 124. At the end of the first phase, the main switch 102 is turned on if the data input of flip flop 106 is high which will happen if the low voltage comparator 108 has a logic high output indicating that the alternator voltage is above a predetermined minimum, the excessive current comparator 112 has a logic high output indicating that the current through inductor 104 is below a predetermined value and the regulating comparator 114 has a logic high output indicating that the battery voltage is less than a predetermined desired value. Otherwise the main switch 102 remains in the off state for all three phases of the clock cycle. If the main switch 102 is turned on during the transition between phase 1 and phase 2 of the clock cycle, it is held on during phase 2 unless the over-voltage comparator 122 goes to logic low and turns off the main switch 102 through the flip-flop 106 at the same time it turns on the recirculating switch 116 through the flip-flop 118 and the switching transistor 178. During phase 3 of the clock cycle, the main switch 102 is turned off if the low voltage comparator 108, the excessive current comparator 112 or the regulating comparator 114 indicates an increased current through the inductor 104 is not desired.

FIG. 5 shows a modified high voltage regulator 16', as mentioned above. The high voltage regulator 16' of FIG. 5 is adapted to power the field winding 36 of the alternator directly from the alternator output. Except for this feature, the high voltage regulator of FIG. 5 is similar to that of FIG. 3 and may be used in the dual voltage power supply system depicted in FIG. 1 in place of the high voltage regulator 16 of FIG. 3. The regulator 16' is not connected with the battery 12 since it utilizes the alternator output voltage to power the field winding 36. The alternator field has sufficient residual magnetism to cause the alternator output voltage to build up when the alternator is driven by the engine. Field current is supplied to the field winding 36 through the transistor 46 when alternator output voltage is available.

Because of the wide range of alternator output voltage, the regulator 16' is adapted to stabilize the field current; for this purpose, comparators 202 and 204 are provided in a circuit arrangement which will be described presently. It is noted that the circuit elements in FIG. 5 which are the same as those in FIG. 3 are designated by the same reference characters. The description of that part of the regulator circuit in FIG. 5 which is the same as that in FIG. 3 will not be repeated; instead, only the additional circuitry will be described.

The field winding 36 is connected in series with the transistor 46 between the output terminals 38 and 42 of the alternator. A reference voltage derived across the zener diode 66 is applied to the noninverting input of the comparator 202 and to the inverting input of the comparator 204. A resistor 206 and a capacitor 208 are connected in series between the output terminal 38 of the alternator and ground. The $\bar{\phi}1$ output of the clock 124 (FIG. 4) is connected through a diode 212 to the inverting input of comparator 202 and is connected directly to the noninverting input of the comparator 204.

The operation of the high voltage regulator of FIG. 5 is as follows. The reference voltage applied to the noninverting input of the comparator 202 and the inverting input of comparator 204 has a value intermediate the low and high levels of the $\bar{\phi}1$ signal from the clock 124. Accordingly, during the low level of the $\bar{\phi}1$ signal, the output of the comparator 204 is at a low level. Accordingly, the common output of the comparators 202, 204, 48 and 52 is at a low level and the transistor 46 is turned off during phase 1 of the clock cycle. At times other than the phase 1 interval of the clock cycle, the output of comparator 204 will be at a high level so that the state of the transistor 46 is determined by the state of the comparators 202, 48 and 52. After phase 1 ends, the $\bar{\phi}1$ clock signal is at a high level and the diode 212 is back-biased by the $\bar{\phi}1$ clock signal. Accordingly, the alternator voltage is effectively applied across the resistor 206 and capacitor 208 and the current through the resistor 206 charges the capacitor 208 and the voltage thereacross rises at a rate proportional to the alternator output voltage. The time required for the voltage across capacitor 208 to reach a level greater than the reference voltage is inversely proportional to the alternator output voltage. When the voltage across the capacitor 208 exceeds the reference voltage the output of comparator 202 is switched to its low state and transistor 46 is turned off. Therefore, during each clock cycle, the maximum time that the transistor 46 can be turned on is limited to a time duration inversely proportional to the alternator output voltage. If comparators 48 and 52 remain in their high output states, the average voltage applied to the field winding 36 is approximately constant and is independent of the alternator output voltage. If either comparator 48 or 52 is switched to its low output state, the effect is to reduce the average voltage applied to the field winding 36.

The operation of the dual voltage power supply system will now be summarized with reference to FIGS. 1, 2 and 5. The output terminals of the alternator 10 are connected to the high voltage load circuit 14 and through the low voltage regulator 18 to the battery 12 and the low voltage load circuit 22. The output terminals of the alternator are also connected with the high voltage regulator 16 and the voltage across the current sensing resistor 76 is also applied to the high voltage regulator. (If the modified high voltage regulator 16' is used, the battery 12 is not connected with the regulator 16' and the switch 44 is not used.) The regulator 16 (or 16') controls the current to the field winding of the alternator. When the alternator 10 is driven at low speed, as with the engine idling, the high voltage regulator 16 (or 16') operates to supply maximum field current. (Assuming the alternator output voltage is not greater than the high voltage regulated value.) As the alternator speed increases, the output voltage increases toward the high voltage regulated value and when this voltage is reached, the regulator 16 (or 16') operates to maintain the output voltage substantially constant at that value. The low voltage regulator 18 receives the alternator output voltage and regulates it to a voltage required to charge the battery 12 and to supply the low voltage load circuit 22.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. In an electrical system for a vehicle, said system being of the type including a DC generator having a DC output, a first load circuit including a battery and one or more load devices adapted to be powered by DC electricity at a voltage in a first voltage range corresponding to the rated voltage of the battery, and a second load circuit including one or more load devices designed to be powered by a DC electricity at a voltage in a second voltage range extending substantially higher than said first voltage range, the improvement comprising:
   a first regulator having an input coupled with a DC output of said DC generator and having an output coupled with said first load circuit, said first regulator including means for converting power received at said input to power at a voltage in said first voltage range,
   and a second regulator for controlling said generator to produce a DC voltage meeting the requirements of said second load circuit, an output of said DC generator being coupled with said second load circuit.

2. The invention as defined in claim 1 wherein said first regulator comprises:
   a switching means and an inductor connected in series with said first load circuit,
   a unidirectional conductive means connected in parallel with the series combination of said inductor and said first load circuit,
   and control means for controlling said switching means.

3. The invention as defined in claim 2 wherein said switching means is a transistor.

4. The invention as defined in claim 2 wherein said unidirectional conductive means is a diode.

5. The invention as defined in claim 2 including:
   recirculating switch means connected to recirculate inductor current,
   a control circuit responsive to the voltage across said first load circuit operatively connected to said recirculating switching means,
   whereby inductor current recirculation is enabled when required to prevent the voltage across said first load circuit from exceeding a predetermined value.

6. The invention a defined in claim 5 in which said recirculating switch means is a transistor.

7. The invention as defined in claim 1 wherein said second regulator regulates the generator output voltage at a predetermined maximum voltage in said second voltage range when the rotation rate of said DC generator is great enough for said maximum voltage to be achieved.

8. The invention as defined in claim 1 wherein said DC generator has a field winding of controllable energization, said second regulator being coupled with said field winding, and wherein said field energization is provided by said DC generator and wherein said regulator includes means for limiting the fraction of the time that said DC generator is connected to the field winding in a manner dependent upon generator output voltage whereby maximum field current is limited.

9. The invention as defined in claim 8 wherein the fraction of the time that the field winding is connected to the generator output is limited to a value substantially inversely proportional to the generator output voltage whereby the limiting field energization is substantially independent of the generator output voltage.

10. The invention as defined in claim 7 including overvoltage protection means for preventing the voltage across said first load circuit from exceeding a predetermined value.

11. The invention as defined in claim 10 wherein said overvoltage protection means comprises a capacitor connected across said first load circuit.

12. The invention as defined in claim 2 including overvoltage protection means for preventing the voltage across said first load circuit from exceeding a predetermined value, said overvoltage protection means including a second switching means connected across said inductor.

13. In an electrical system for a vehicle, said system being of the type including a DC generator having a DC output, a storage battery adapted to be charged from the generator, a first load circuit including said storage battery and one or more load devices designed to be powered by DC electricity at a voltage in a first voltage range corresponding to the rated voltage of the battery, and a second load circuit including one or more load devices designed to be powered by DC electricity at a voltage in a second voltage range extending substantially higher than said first voltage range, the improvement comprising:
   a regulator for controlling said generator to produce an output voltage meeting the requirements of said second load circuit,
   a DC output of said DC generator being coupled with said second load circuit,
   a DC output of said DC generator being coupled with a series combination of a switching means, an inductor and said first load circuit,
   a unidirectional conductive means connected in parallel with the series combination of said inductor and said first load circuit,
   and control means for controlling said switching means.

14. The invention as defined in claim 13 including:
   a control circuit responsive to the voltage across said first load circuit and operatively coupled with said switching means for switching said switching means to a nonconductive state in response to a voltage across said first load circuit greater than a predetermined voltage.

15. The invention as defined in claim 13 wherein said control means is responsive to the voltage across said first load circuit.

16. The invention as defined in claim 13 wherein said switching means is a transistor.

17. The invention as defined in claim 13 wherein said unidirectional conductive means is a diode.

18. The invention as defined in claim 13 including:

recirculating switch means connected to recirculate inductor current, a control circuit responsive to the voltage across said first load circuit operatively connected to said recirculating switching means, whereby inductor current recirculation is enabled when required to prevent the voltage across said first load circuit from exceeding a predetermined value.

19. The invention as defined in claim 13 wherein said regulator regulates the generator output voltage at a predetermined maximum voltage in said second voltage range when the rotation rate of said generator is great enough for said maximum voltage to be achieved.

20. The invention as defined in claim 13 wherein said generator has a field winding of controllable energization, said regulator being coupled with said field winding, and wherein said field energization is provided by said generator and wherein said regulator includes means for limiting the fraction of the time that the generator is connected to the field winding in a manner dependent upon generator output voltage whereby maximum field current is limited.

21. The invention as defined in claim 13 including overvoltage protection means for preventing the voltage across said first load circuit from exceeding a predetermined value.

* * * * *